(12) United States Patent
Nuggehalli et al.

(10) Patent No.: US 10,567,554 B2
(45) Date of Patent: Feb. 18, 2020

(54) ROUTING SOLUTIONS FOR LTE-WLAN AGGREGATION

(71) Applicant: MEDIATEK INC., Hsinchu (TW)

(72) Inventors: Pavan Santhana Krishna Nuggehalli, San Carlos, CA (US); Chie-Ming Chou, Taichung (TW); Chia-Chun Hsu, New Taipei (TW)

(73) Assignee: HFI Innovation INC., Hsin-Chu (TW)

( * ) Notice: Subject to any disclaimer, the term of this patent is extended or adjusted under 35 U.S.C. 154(b) by 79 days.

(21) Appl. No.: 15/153,959

(22) Filed: May 13, 2016

(65) Prior Publication Data

US 2016/0337485 A1 Nov. 17, 2016

Related U.S. Application Data

(60) Provisional application No. 62/162,304, filed on May 15, 2015.

(51) Int. Cl.
```
H04L 29/06       (2006.01)
H04L 12/911      (2013.01)
H04L 12/741      (2013.01)
```

(52) U.S. Cl.
CPC .............. *H04L 69/22* (2013.01); *H04L 45/74* (2013.01); *H04L 47/825* (2013.01)

(58) Field of Classification Search
CPC ....... H04L 69/22; H04L 45/74; H04L 47/825; H04L 69/03

(Continued)

(56) References Cited

U.S. PATENT DOCUMENTS

| | | | | |
|---|---|---|---|---|
| 6,041,166 A | * | 3/2000 | Hart | ........................ G06F 9/542 |
| | | | | 709/220 |
| 8,824,298 B2 | * | 9/2014 | Gupta | ............... H04W 28/0215 |
| | | | | 370/235 |

(Continued)

FOREIGN PATENT DOCUMENTS

| | | |
|---|---|---|
| CN | 101277305 A | 5/2008 |
| CN | 104054375 A | 11/2011 |

(Continued)

OTHER PUBLICATIONS

International Search Report and Written Opinion of International Search Authority for PCT/CN2016/082194 dated Aug. 15, 2016 (11 pages).

(Continued)

*Primary Examiner* — Stephen J Clawson
(74) *Attorney, Agent, or Firm* — Imperium Patent Works; Helen Mao; Zheng Jin

(57) ABSTRACT

Apparatus and methods are provided for user-plane LWA PDU routing. In one novel aspect, LTE PDU packets are routed through a WLAN AP to a UE by encapsulation of the data packets. In one embodiment, a bridge/VLAN architecture is used. The UE identifies one or more Ethernet Frames received the WLAN interface as containing the PDCP PDUs by decoding the EtherType. In another embodiment, the WLAN terminated tunneling is used by decoding the EtherType of indicating the PDCP type. In another novel aspect, an UE-terminated tunneling is created. In one embodiment, the IP tunneling is used. In another embodiment, the GRE tunneling is used. The GRE header contains a KEY field to identify the packets as being the LWA packets. In yet another embodiment, the IPSec tunneling is used. The SPI of the header is used to identify the packets as being the LWA data packets.

20 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2011/0058556 A1 | 3/2011 | He | 370/392 |
| 2012/0099602 A1* | 4/2012 | Nagapudi | H04L 12/4633 370/401 |
| 2014/0204927 A1 | 7/2014 | Horn et al. | 370/338 |
| 2014/0287769 A1 | 9/2014 | Taori et al. | 455/450 |
| 2014/0293970 A1* | 10/2014 | Damnjanovic | H04L 5/0078 370/336 |
| 2014/0321376 A1* | 10/2014 | Damnjanovic | H04W 72/1215 370/329 |
| 2014/0369198 A1 | 12/2014 | Rinne et al. | 370/235 |
| 2015/0043435 A1* | 2/2015 | Blankenship | H04L 69/322 370/329 |
| 2015/0092696 A1* | 4/2015 | Liu | H04W 76/12 370/329 |
| 2015/0110048 A1 | 4/2015 | Damnjanovice et al. | 370/329 |
| 2015/0139184 A1 | 5/2015 | Wang et al. | 370/331 |
| 2016/0192266 A1 | 6/2016 | Dai et al. | 370/331 |
| 2017/0055313 A1* | 2/2017 | Sharma | H04W 76/15 |
| 2017/0094701 A1* | 3/2017 | Hong | H04W 76/022 |
| 2017/0215173 A1* | 7/2017 | Zhu | H04W 28/065 |
| 2017/0245252 A1* | 8/2017 | Gao | H04W 72/042 |
| 2017/0257265 A1* | 9/2017 | Hong | H04L 41/0803 |

FOREIGN PATENT DOCUMENTS

| | | |
|---|---|---|
| CN | 103582011 A | 7/2012 |
| WO | WO2015032043 A1 | 9/2013 |
| WO | WO2014116569 A1 | 1/2014 |
| WO | WO2014148818 A1 | 9/2014 |
| WO | WO2015057817 A2 | 4/2015 |

OTHER PUBLICATIONS

3GPP TSG-RAN WG2 Meeting #89bis R2-151478, Alcatel-Lucent et al., Architecture for LTE-WiFi Aggregation, Bratislave, Slovakia dated Apr. 20-24, 2015 (5 pages).

SIPO, office action for the CN patent application 201680004327.3 (no English translation is available) dated Nov. 6, 2019 (13 pages).

R2-151482 3GPP TSG-RAN WG2 #89bis, Broadcom Corp., "Architecture for LTE-WLAN RAN Level Integration and Interworking Enhancement and Analysis", Bratislava, Slovakia, dated Apr. 20-24, 2015 (10 pages).

* cited by examiner

ROUTING SOLUTIONS FOR LTE-WLAN AGGREGATION

CROSS REFERENCE TO RELATED APPLICATIONS

This application claims priority under 35 U.S.C. § 119 from U.S. Provisional Application No. 62/162,304 entitled "METHOD AND APPARATUS OF USER PLANE ARCHITECTURE FOR LWA" filed on May 15, 2015, the subject matter of which is incorporated herein by reference.

TECHNICAL FIELD

The disclosed embodiments relate generally to wireless communication, and, more particularly, to LTE-WLAN aggregation (LWA) PDU routing.

BACKGROUND

Mobile data usage has been increasing at an exponential rate in recent year. A Long-Term Evolution (LTE) system offers high peak data rates, low latency, improved system capacity, and low operating cost resulting from simplified network architecture. In LTE systems, an evolved universal terrestrial radio access network (E-UTRAN) includes a plurality of base stations, such as evolved Node-B's (eNBs) communicating with a plurality of mobile stations referred as user equipment (UEs). However, the continuously rising demand for data traffic requires additional solutions. Internetworking between the LTE network and the unlicensed spectrum WLAN provides additional bandwidth to the operators. The LTE-WLAN aggregation (LWA) provides data aggregation at the radio access network where an eNB schedules packets to be served on LTE and WiFi radio link. The advantage of this solution is that it can provide better control and utilization of resources on both links. This can increase the aggregate throughput for all users and improve the total system capacity by better managing the radio resources among users. However, issues remain as to how to implement efficiently the LWA. The first issue is how to handle the U-plane (LTE packet data unit (PDU)) bearer splitting for the LWA. The second issue is how to identify the LTE PDU by the WLAN AP modem or WLAN WiFi modem and how to make correct operations.

Improvements and enhancements are required for LWA PDU routing.

SUMMARY

Apparatus and methods are provided for user-plane LWA PDU routing. In one novel aspect, LTE PDCP PDU packets are routed through a WLAN AP to a UE by encapsulation of the data packets. In one embodiment, a bridge/VLAN architecture is used, where the eNB and the WLAN AP are configured to be in the same VLAN. The UE identifies one or more WLAN Frames received over the WLAN interface as containing the PDCP PDUs by decoding the EtherType for the LWA. In another embodiment, the WLAN AP terminated tunneling is used. The UE identifies the received packets as being the PDCP PDUs payload type by decoding the EtherType of received WLAN frame. The LTE eNB and the WLAN AP employ IP-based tunneling mechanisms to forward the LWA data packets.

In another novel aspect, UE-terminated tunneling is used for the user-plane LWA. An IP-based tunneling is created for the LWA data packets. In one embodiment, the IP tunneling is used. In another embodiment, the GRE tunneling is used. The GRE header contains a KEY field to identify the packets as being the LWA packets. In yet another embodiment, the IPSec tunneling is used. The SPI of the header is used to identify the packets as being the LWA data packets.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

LWA is a tight integration at radio level, which allows for real-time channel and load aware radio resource management across WLAN and LTE to provide significant capacity and QoE improvements. When enabling LWA, S1-U is terminated at eNB whereby all IP packets are routing to eNB and perform PDCP aspects (i.e., ROHC, ciphering) as an LTE PDCP PDU. Afterwards, eNB can schedule whether LWA-LTE link or LWA-Wi-Fi link the LTE PDCP PDU shall go. In this invention, we disclose how a LTE PDCP PDU being routing over eNB-AP and AP-Wi-Fi modem. To this end, adaption layer with (de-)encapsulation mechanism located at eNB and Wi-Fi modem is introduced to provide such innovation without changing WLAN AP behavior significantly. LWA borrows the concept of existing dual connectivity to let WLAN network being transparent to CN for reducing CN load and support "Packet level" offload. It is understood by one of ordinary skills in the art that the principle of the methods may apply other data aggregation scenarios. Though LTE and WLAN are being used in the description, the disclosed method applies to other RAN as well.

Figure 1:
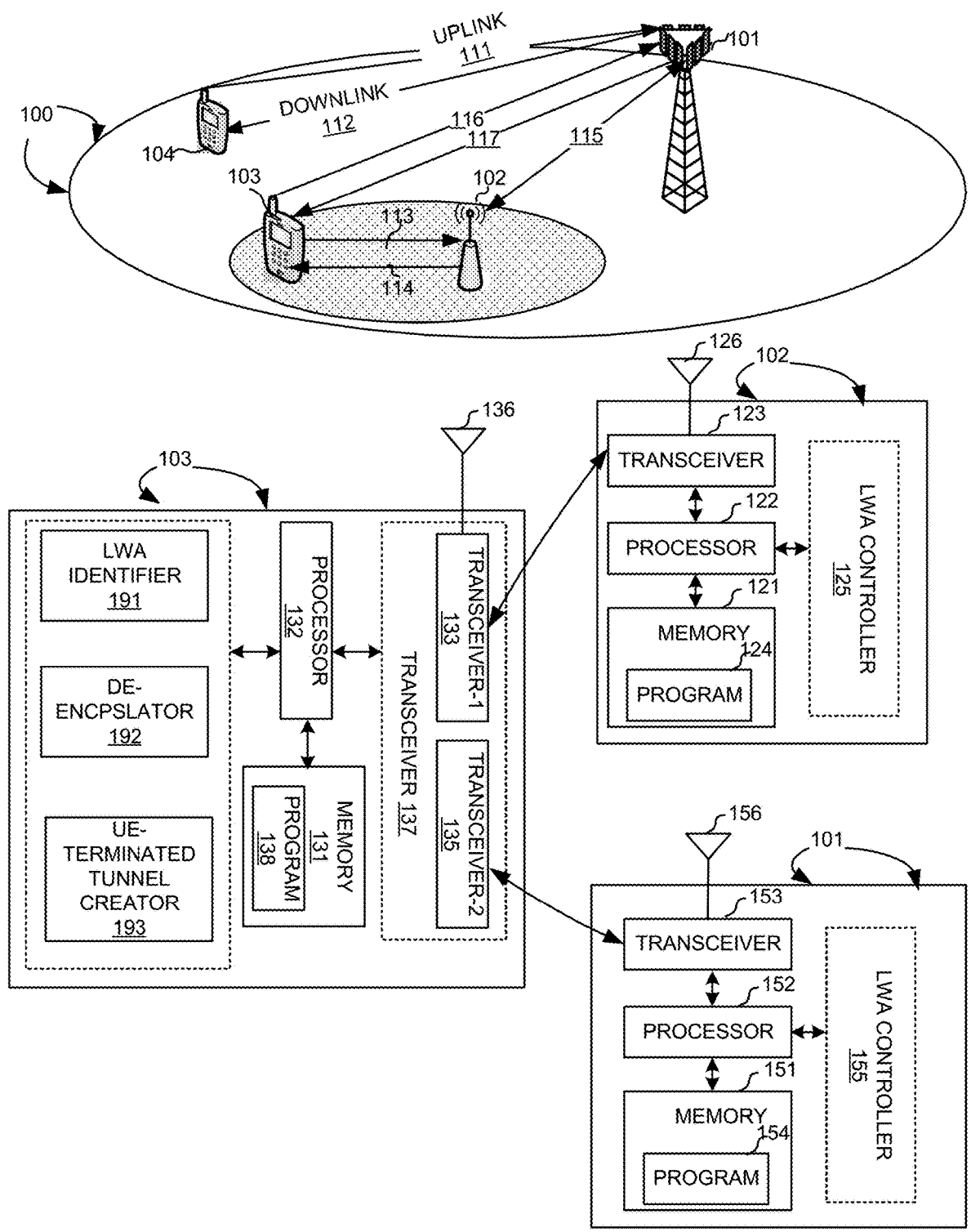
FIG. 1 illustrates a system diagram of a wireless network with LWA in accordance with embodiments of the current invention.

FIG. 1 illustrates a system diagram of a wireless network 100 with the LWA in accordance with embodiments of the current invention. Wireless communication system 100 includes one or more fixed base infrastructure units, such as base stations 101 and 102, forming a network distributed over a geographical region. The base unit may also be referred to as an access point, an access terminal, a base station, a Node-B, an eNode-B, or by other terminology used in the art. The one or more base stations 101 and 102 serve a number of mobile stations 103 and 104 within a serving area, for example, a cell, or within a cell sector. Base stations 101 and 102 can support different RATS. In a particular example, base station 101 is a LTE eNB and 102 is a WLAN access point (AP). The two base stations simultaneously serve the mobile station 103 within their common coverage.

eNB 101 and WLAN AP 102 transmit downlink communication signals 112, 114 and 117 to mobile stations in the time and/or frequency domain. Mobile station 103 and 104 communicate with one or more eNB 101 and WLAN AP 102 via uplink communication signals 111, 113 and 116. In one novel aspect, UE 103 connects with eNB 101 and is associated with WLAN AP 102. UE 103 is LWA-enabled. In one embodiment, the UE 103 is served with and aggregates data traffic from both eNB 101 and WLAN AP 102. In another embodiment, the UE may transmit data traffic to both eNB 101 and WLAN AP 102.

FIG. 1 further shows simplified block diagrams of eNB 101, WLAN AP 102, and mobile station 103 in accordance with the current invention. eNB 101 has an antenna 156, which transmits and receives radio signals. A RF transceiver module 153, coupled with the antenna, receives RF signals from antenna 156, converts them to baseband signals and sends them to processor 152. RF transceiver 153 also converts received baseband signals from processor 152, converts them to RF signals, and sends out to antenna 156. Processor 152 processes the received baseband signals and invokes different functional modules to perform features in eNB 101. Memory 151 stores program instructions and data 154 to control the operations of eNB 101. eNB 101 also includes a set of control modules such LWA controller 115 that carry out functional tasks to support LWA features and to communicate with mobile stations.

Similarly, WLAN AP 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. WLAN AP 102 also includes a set of control modules, such as LWA controller 125 that carries out functional tasks to support the LWA features and to communicate with mobile stations.

Mobile station 103 has an antenna 136, which transmits and receives radio signals. A RF transceiver module 137, coupled with the antenna, receives RF signals from antenna 136, converts them to baseband signals and sends them to processor 132. RF transceiver 137 also converts received baseband signals from processor 132, converts them to RF signals, and sends out to antenna 136. Processor 132 processes the received baseband signals and invokes different functional modules to perform features in mobile station 103. Memory 131 stores program instructions and data 138 to control the operations of mobile station 103. Transceiver 137 of mobile station 103 includes two transceivers 133 and 135. Transceiver 135 transmits and receives transmissions to/from transceiver 153 of eNB 101. Transceiver 135 transmits and receives transmissions to/from transceiver 123 of WLAN 102. In another embodiment, mobile station 103 has only one transceiver, which handles radio link communications with eNB 101 and WLAN AP 102.

Mobile station 103 also includes a set of control modules that carry out functional tasks. An LWA identifier 191 identifies one or more received data packets from the second RAN as being data-aggregation packets from the first RAN. A de-encapsulator 192 de-encapsulates the identified data-aggregation packets received from the second RAN and decodes the first RAN packet data units (PDUs). An UE-terminated tunnel creator 193 creates an IP based tunnel between the first RAN and the UE, and wherein the LWA identifier identifies data packets received from the IP based tunnel as the data-aggregation packets.

Figure 2:
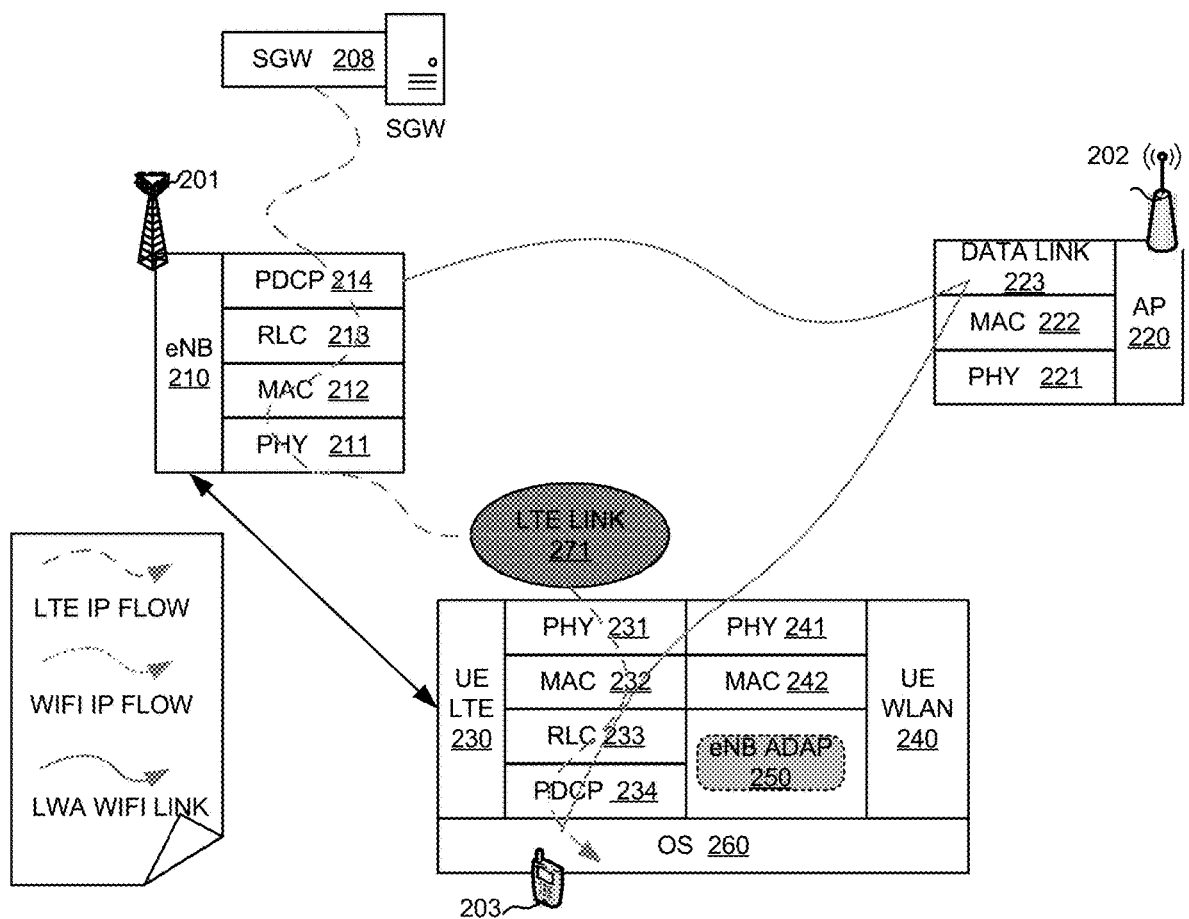
FIG. 2 illustrates an exemplary diagram of a data packets routing in a LWA system including a UE, an eNB and a WLAN AP in accordance with embodiments of the current invention.

FIG. 2 illustrates an exemplary diagram of a data packets routing in a LWA system including a UE, an eNB and a WLAN AP in accordance with embodiments of the current invention. A UE 203 is connected with an eNB 201. UE 203 selects a WLAN AP 202 for data traffic aggregation with eNB 201 and is associated with WLAN AP 202. eNB 201 connects with a serving gateway (SGW) 208 for data traffic. eNB 201 has an eNB LTE modem 210, including a protocol stack comprises a PHY layer 211, a MAC layer 212, a radio link control (RLC) layer 213 and a PDCP layer 214. WLAN AP 202 has an AP WiFi modem 220, including a protocol stack comprises a PHY layer 221, a MAC layer 222, and an IP layer 223. UE 203 has dual stack, including a UE LTE modem 230, and a UE WLAN/WiFi modem 240. UE LTE modem has a protocol stack comprises a PHY layer 231, a MAC layer 232, a RLC layer 233, and a PDCP layer 234. UE WLAN modem has a protocol stack comprises a PHY layer 241, and a MAC layer 242. UE 203 also has an eNB adaption module 250 that communicates with the UE WLAN stack 240.

A LTE IP flow comes from SGW 208, passes through eNB 210 stack and gets to UE LTE 230 stack through a LTE link 271. In one embodiment, data traffic between eNB 201 and UE 203 is diverted to WLAN AP 202 and aggregated. A LWA WiFi link path starts with encapsulated Ethernet frames through an Ethernet channel 272 and gets to data link layer 223 of WLAN AP 202. WLAN AP 202 re-encapsulates the received data packets and sends it to UE 203.

Figure 3:
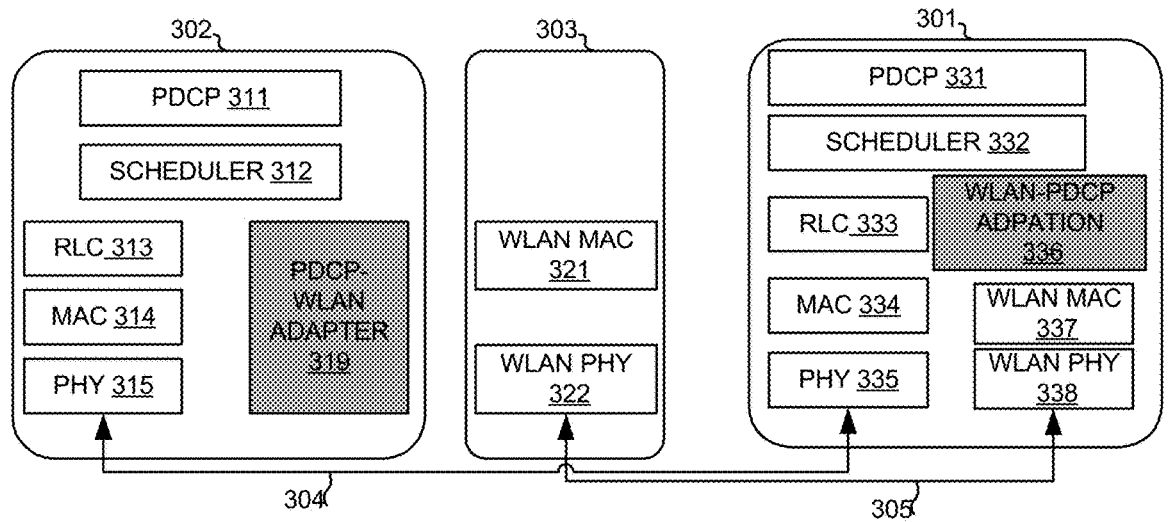
FIG. 3 shows exemplary block diagrams of a UE with LWA-enabled connecting with an eNB and a WLAN AP with data aggregation at radio link level in accordance with embodiments of the current invention.

FIG. 3 shows exemplary block diagrams of a UE with LWA-enabled connecting with an eNB and a WLAN AP with data aggregation at radio link level in accordance with embodiments of the current invention. A UE 301 is connected with an eNB 302. UE 301 also selects a WLAN AP 303 for data aggregation. eNB 302 has a PHY layer 315, a MAC layer 314, a RLC layer 313, a scheduler layer 312 and a PDCP layer 311. To enable the LWA, eNB 302 also has a PDCP-WLAN adapter 319 that aggregates the LTE data traffic through PHY 315 with WLAN data traffic through WLAN AP 303. WLAN AP 303 has a WLAN PHY 322 and a WLAN MAC layer 321. WLAN AP 303 connects with WLAN network and can offload data traffic from the LTE network when the UE with LWA enabled is connected with both the LTE eNB and the WLAN AP.

UE 301 is LWA-enabled. UE 301 has a PHY 335, a MAC 334, and a RLC layer 333 that connect with the LTE eNB 302. UE 301 also has a WLAN PHY layer 338 and a WLAN MAC layer 337 that connect with WLAN AP 303. A WLAN-PDCP adaption layer 336 handles the split carrier from the LTE and the WLAN. UE 301 also has a scheduler 332 and PDCP 331. In novel aspect, the WLAN AP is selected based on a LWA assistance configuration. UE 301 aggregation its data traffic with eNB 302 and WLAN AP 303. WLAN PHY 322 of WLAN AP 303 connects with WLAN PHY 338 of UE 301 through WLAN interface. PHY 315 of LTE eNB 302 connects with PHY 335 of UE 301 through uu interface. Both the LTE data traffic and the WLAN data traffic is aggregated at the PDCP layer of UE 301.

In one novel aspect, bridge/virtual LAN (VLAN) architecture is used for the user plane LWA. This architecture is applicable for the bridged network deployment mentioned above. Further, we will assume that the eNB and WLAN support virtual LANs (VLANs). In this architecture, data forwarding is based on (Ethernet) MAC addresses and virtual LAN (VLAN) or 802.1Q tags. The 802.1Q tag is a 32-bit field added to Ethernet frames by the eNB and processed by the AP. The 802.1Q tag is shown in FIG. 4A.

Figure 4A:
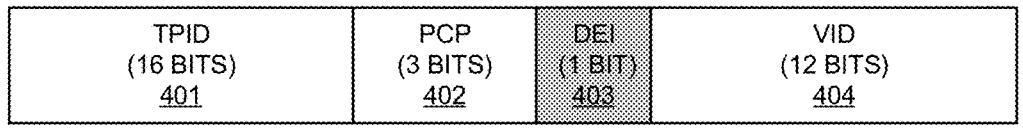
FIG. 4A illustrates an exemplary data structure of the 802.1Q tag used for bridge/VLAN solution for LWA in accordance with embodiments of the current invention.

FIG. 4A illustrates an exemplary data structure of the 802.1Q tag used for bridge/VLAN solution for LWA in accordance with embodiments of the current invention. The 802.1Q frame is a 32-bit field between the source MAC address and the EtherType/length field of the original frame. It has a 16-bit tag protocol identifier (TPID) 401, a 3-bit tag priority code point (PCP) 402, a 1-bit drop eligible indicator (DEI) 403 and a 12-bit VLAN identifier (VID) 404. Transporting PDCP PDUs over Ethernet (IEEE 802.3) and WLAN (IEEE 802.11) frames raises a couple of technical challenges. First, currently Ethernet and WLAN frames do no support transport of PDCP PDUs. Second, a mechanism is needed for the UE to determine whether the received WLAN frame contains a PDCP PDU or not. An efficient approach that solves both problems is to introduce a new EtherType for PDCP PDUs. EtherType is a two-byte field in Ethernet and WLAN frames that is used to indicate the protocol encapsulated in the payload of the Ethernet or WLAN frame. The use of PDCP EtherType allows efficient transport of PDCP PDUs in WLAN frames since no other kind of encapsulation (e.g., IP or GRE) that introduces additional overhead is necessary. Also once the WLAN frame is received at the UE, the UE can check the EtherType field to quickly identify those frames that need to be processed by the LTE layer as opposed to higher layers (like IP).

Figure 4B:
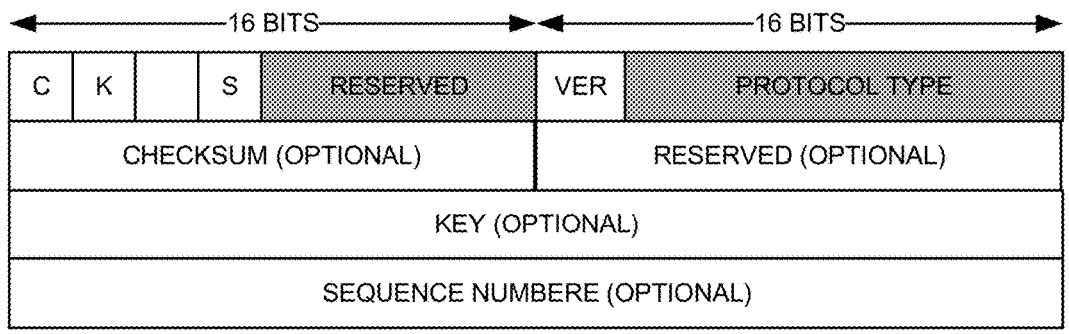
FIG. 4B illustrates an exemplary data structure of the GRE header to be used for the user plan LWA in accordance with embodiments of the current invention.

In another novel aspect, Generic Routing Encapsulation (GRE) tunneling is used for the user plane LWA. The GRE and its extension allow flexible transport of any network protocol over another network protocol. GRE inserts a header of its own between the inner and outer network protocol headers. The GRE header is shown in FIG. 4B. In the case of LWA, IP can serve as the outer network protocol and PDCP can be thought as the inner protocol.

FIG. 4B illustrates an exemplary data structure of the GRE header to be used for the user plan LWA in accordance with embodiments of the current invention. The GRE header includes a 1-bit checksum, a 1-bit key bit, which is set if a key is present. The GRE header also includes a 1-bit Sequence number bit, a version field, and a protocol type field. The protocol type indicates the Ether protocol type of the encapsulated payload. The Key field K-bit is set and contains application specific key value. The 2-byte protocol field in the header carries the EtherType of the encapsulated protocol. If a new EtherType for PDCP PDUs is agreed, the GRE can be used without any modification for the PDCP PDU transport.

In one novel aspect, a bridge/VLAN architecture is used to implement the user plan LWA. In another novel aspect, a UE terminated IP-based tunnel is used to implement the user plan LWA. In yet another novel aspect, the WT terminated tunnel is used to implement the user plan LWA. Each of the implementation allows the PDCP PDU to be transported via the WLAN frames and UE can aggregate the data on the user plane.

Figure 5:
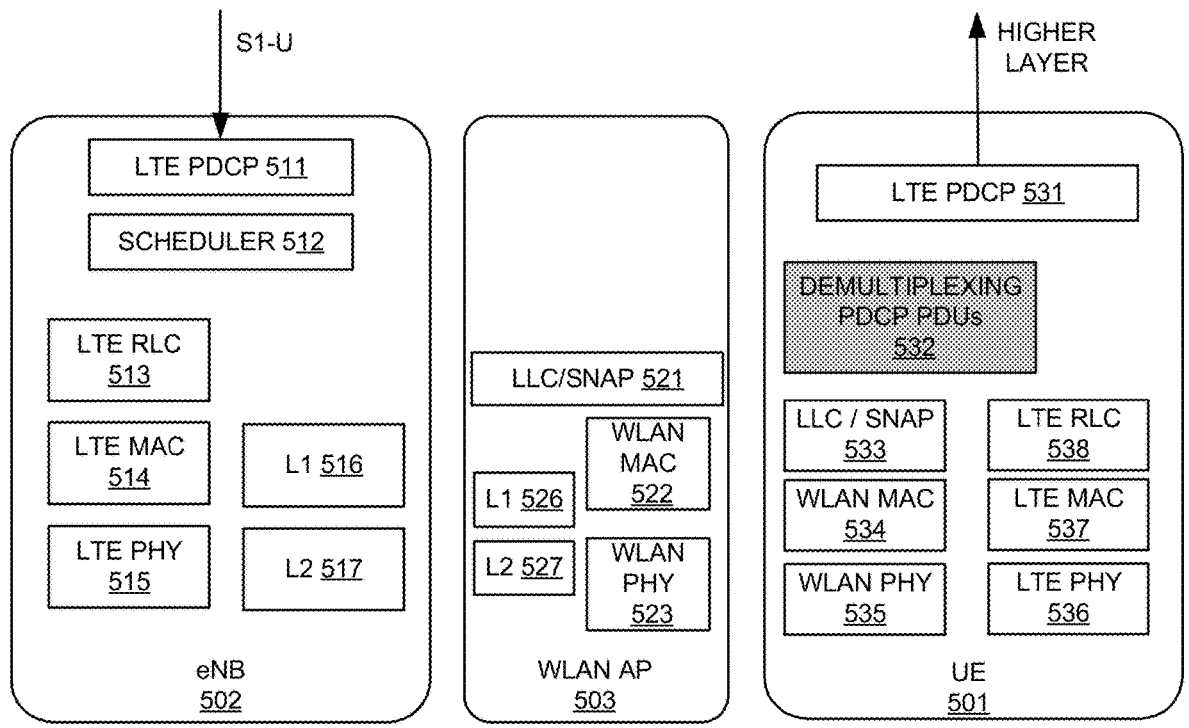
FIG. 5 shows an exemplary diagram of the bridge/VLAN implementation of the user plane LWA in accordance with embodiments of the current invention.

FIG. 5 shows an exemplary diagram of the bridge/VLAN implementation of the user plane LWA in accordance with embodiments of the current invention. A UE 501 connects to an eNB 502 and a WLAN AP 503. eNB 502 has a LTE protocol stack including a LTE PHY 515, a LTE MAC 514, and a LTE RLC 513. eNB 502 also has a L1 516 and a L2 517 that communicates with WLAN APs. eNB 502 has a scheduler 512 and a LTE PCP 511, which receives data packets from S1-U. WLAN AP 503 has a WLAN protocol stack including a WLAN PHY 523, and a WLAN MAC 522. WLAN AP 503 also has a L1 526 and a L2 527 that communicates with eNBs. WLAN AP 503 includes a LLC/SNAP layer 521. UE 501 aggregates data packets from eNB 502 and WLAN AP 503 using LWA. UE 501 has a LTE protocol stack including a LTE PHY 536, a LTE MAC 537, and a LTE RLC 538. UE 501 also includes a WLAN stack, including a WLAN PHY 535, a WLAN MAC 534, and a LLC/SNAP layer 533. A LTE PDCP layer 531 passes LTE PDCP PDUs to higher layer. In one embodiment, bridge/VLAN architecture is used for the user-plane data aggregation. A de-multiplexing PDCP PDUs layer 532 is included in UE 501.

Transporting PDCP PDUs over Ethernet (IEEE 802.3) and WLAN (IEEE 802.11) frames raises a couple of technical challenges. First, currently Ethernet and WLAN frames do no support transport of PDCP PDUs. Second, a mechanism is needed for the UE to determine whether the received WLAN frame contains a PDCP PDU or not. An efficient approach that solves both problems is to introduce a new EtherType for PDCP PDUs. EtherType is a two-byte field in Ethernet and WLAN frames that is used to indicate the protocol encapsulated in the payload of the Ethernet or WLAN frame. The use of PDCP EtherType allows for efficient transport of PDCP PDUs in WLAN frames since no other kind of encapsulation (e.g., IP or GRE) that introduces additional overhead is necessary. Also once the WLAN frame is received at the UE, the UE can check the EtherType field to quickly identify those frames that need to be processed by the LTE layer as opposed to higher layers (like IP). Even with the definition of a new EtherType, there remains the challenge at the UE side of being able to distinguish between PDCP PDUs belonging to different bearers. Virtual MAC addresses and having the eNB append a one-byte header with radio bearer identity information might be the possible approaches. In one embodiment, defining a new PDCP header is more advantageous since this solution is also applicable for other user-plane interface options discussed later. Such solution also places LTE specific intelligence in the PDCP layer rather than relying on other layers and implementation options. We propose to extend the PDCP Data PDU format for PDCP PDUs being carried over WLAN with DRB identity information. It should be obvious to those skilled in the art that the layer responsible for adding DRB identity information can be either at the PDCP layer or some new layer.

In one embodiment, the eNB and WLAN can be assigned to a VLAN dedicated for LWA. The eNB encapsulates the PDCP PDU (extended with DRB information) natively in Ethernet frames by specifying the EtherType as LWA. At the WLAN side, the AP copies the EtherType to the WLAN frame's EtherType field as per standard procedure. On receipt of the WLAN frame, the UE identifies the payload as PDCP PDU and transfers the PDCP PDU to the LTE entity in the UE. In one embodiment, a new EtherType is defined to indicate the payload is PDCP PDUs. De-multiplexing PDCP PDUs layer 532 parses the new header to route the PDCP PDU to the appropriate PDCP entity. This option has no impact on WLAN AP implementation since introduction of new EtherType requires no new action from the WLAN AP. Further, this option permits QoS differentiation since once the AP can use the PCP field (tagged by the eNB) to identify the IEEE 802.11e QoS class to apply for the received frame.

The bridge/VLAN solution has small impact on WLAN and the UE side. However, it requires that the eNB and the WLAN be on the same VLAN. Such implementation may be difficult if the LTE and the WLAN are carried by different carriers. Solutions for multi-carrier for user-plane LWA require other architecture. In one embodiment, UE terminated tunneling is used. In another embodiment, WLAN terminated tunneling is used.

Figure 6:
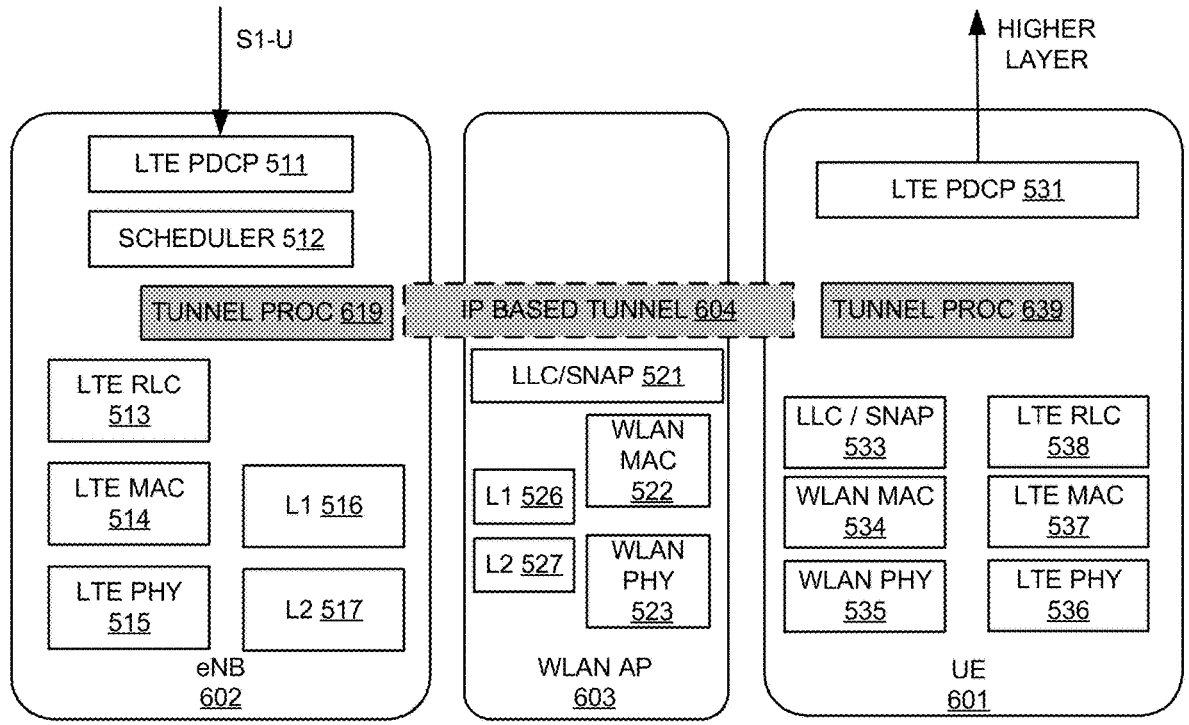
FIG. 6 shows an exemplary diagram of the UE terminated tunneling for the user-plane LWA in accordance with embodiments of the current invention. UE

FIG. 6 shows an exemplary diagram of the UE terminated tunneling for the user-plane LWA in accordance with embodiments of the current invention. UE 601 connects with an LTE eNB 602 and a WLAN AP 603. UE 601, eNB 602 and WLAN AP 603 has dual protocol stacks as shown in FIG. 5. In one novel aspect, instead of using the same VLAN for data forwarding, an IP based tunnel is established between eNB 602 and UE 601. An IP based tunnel protocol stack 619 resides in eNB 602. An IP based tunnel protocol stack 639 resides in eNB 601. An UE terminated IP-based tunnel 604 is created.

In this architecture, the eNB transfers PDCP PDUs over a tunnel established between the eNB and the UE. In many WLAN deployments (e.g., enterprise WLAN deployed in a corporate campus), the UE's WLAN interface will not be assigned a routable IP address. The eNB needs to provide a routable IP address to the UE to establish an IP based tunnel. In one embodiment, the routable IP address is sent to the UE through RRC signaling. There are many possible tunneling options. For example, IP tunneling, GRE tunneling, and IPSec tunneling can be used for the user-plane LWA. Other options are also available.

In one embodiment, IP tunneling is used. In this option, PDCP PDUs are transported within IP packets as higher layer payload. IP does not support transport of PDCP PDUs directly, and that current IP tunneling protocols are primarily meant to carry encapsulated IP packets. In one embodiment, to enable PDCP PDUs to be transport efficiently over IP, a new protocol number will need to be requested from IANA/IETF. In order to support bearers using this option, it is necessary to extend the PDCP header format as proposed earlier. IP provides native support for differentiated QoS using the DSCP field in IPv4 Type of Service (ToS) and IPv6 Traffic Class (TC) fields. UE based mechanisms will be required for flow control and feedback.

In another embodiment, GRE tunneling is used. The GRE and its extension allow flexible transport of any network protocol over another network protocol. GRE inserts a header of its own between the inner and outer network protocol headers. The GRE header is shown in FIG. 2. In the case of LWA, IP can serve as the outer network protocol and PDCP can be thought of as the inner protocol. If UE terminated tunneling is chosen as an option for LWA user plane architecture, then GRE tunneling is the preferred encapsulation mechanism. The GRE approach also provides an alternative mechanism for supporting multiple bearers. RFC 2890 describes a 32-bit Key field. The Key field can be used for identifying the DRB of the PDCP PDU being carried in the GRE tunnel. As pointed out earlier, it may be preferable to extend the PDCP header as a mechanism that can work over different user plane options.

In yet another embodiment, IPSec tunneling is used. In this option, PDCP PDUs are transported within IPSec packets as higher layer payload. IPSec tunneling protocols are primarily meant to carry encrypted and encapsulated IP packets. In one embodiment, the IPSec protocol is to use the Security Parameters Index (SPI) to identify the DRB of the PDCP PDU being carried in the payload. The chief advantage of the tunneling approaches described in this section is that they are largely transparent to the WLAN entity and can be supported over legacy WLAN APs.

Figure 7:
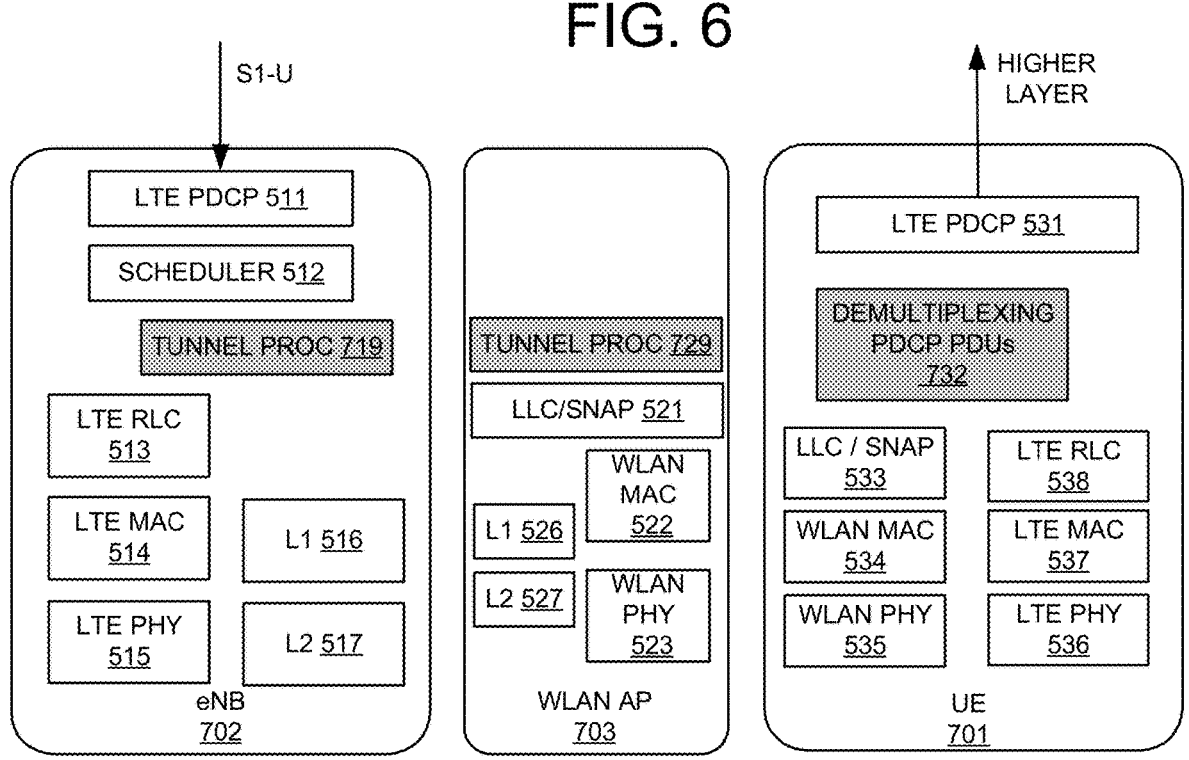
FIG. 7 shows an exemplary diagram of the WLAN terminated tunneling for the user-plane LWA in accordance with embodiments of the current invention.

FIG. 7 shows an exemplary diagram of the WLAN terminated tunneling for the user-plane LWA in accordance with embodiments of the current invention. UE 701 connects with an LTE eNB 702 and a WLAN AP 703. UE 701, eNB 702 and WLAN AP 703 has dual protocol stacks as shown in FIG. 5. In one novel aspect, an IP based tunnel is created between eNB 702 and WLAN AP 703. An IP based tunnel protocol stack 719 resides in eNB 702. An IP based tunnel protocol stack 729 resides in WLAN AP 703. An WLAN terminated IP-based tunnel is created. UE 701 includes a de-multiplexing PDCP PDUs module 732. It receives data packets from the WLAN, decodes the EtherType of the Ethernet frame and determines if it carries the PDCP PDUs. If so, it de-multiplexing the data packets.

In this approach, the eNB and WLAN establish a tunnel between each other (e.g., GRE as discussed in the previous section) for carrying PDCP PDUs from the eNB to the WLAN. Assuming that EtherType for PDCP is supported, the WLAN can strip the PDCP payload and pack them in WLAN frames with the appropriate EtherType tag. This approach has several advantages over the UE terminated tunneling approaches. First, only a single tunnel is required between the eNB and AP as opposed to UE specific tunnels for the latter. Second, UE complexity is considerably reduced since there is no need to have IP/GRE tunnel endpoint at the UE. On the other hand, terminating the tunnel at the WLAN does have some implementation impact on the WLAN entities. However most WLAN APs and ACs are likely to support GRE tunneling already and setting up a GRE tunnel between the eNB and WLN is likely to entail much less complexity than supporting GTP-U. A mechanism is also required to enable the WLAN to determine the UE to which the frames received from the eNB are to be sent. In one embodiment, the UE reports its WLAN MAC address to the eNB. The eNB and WLAN then map the MAC address to a 32-bit value that can be used with the KEY field to identify the UE using the GRE header. A similar enhancement is possible for IPSec tunnels with the SPI field being used to identify the UE. The PDCP header format extension proposed in Proposal 3 is required to support multiple bearers.

Figure 8:
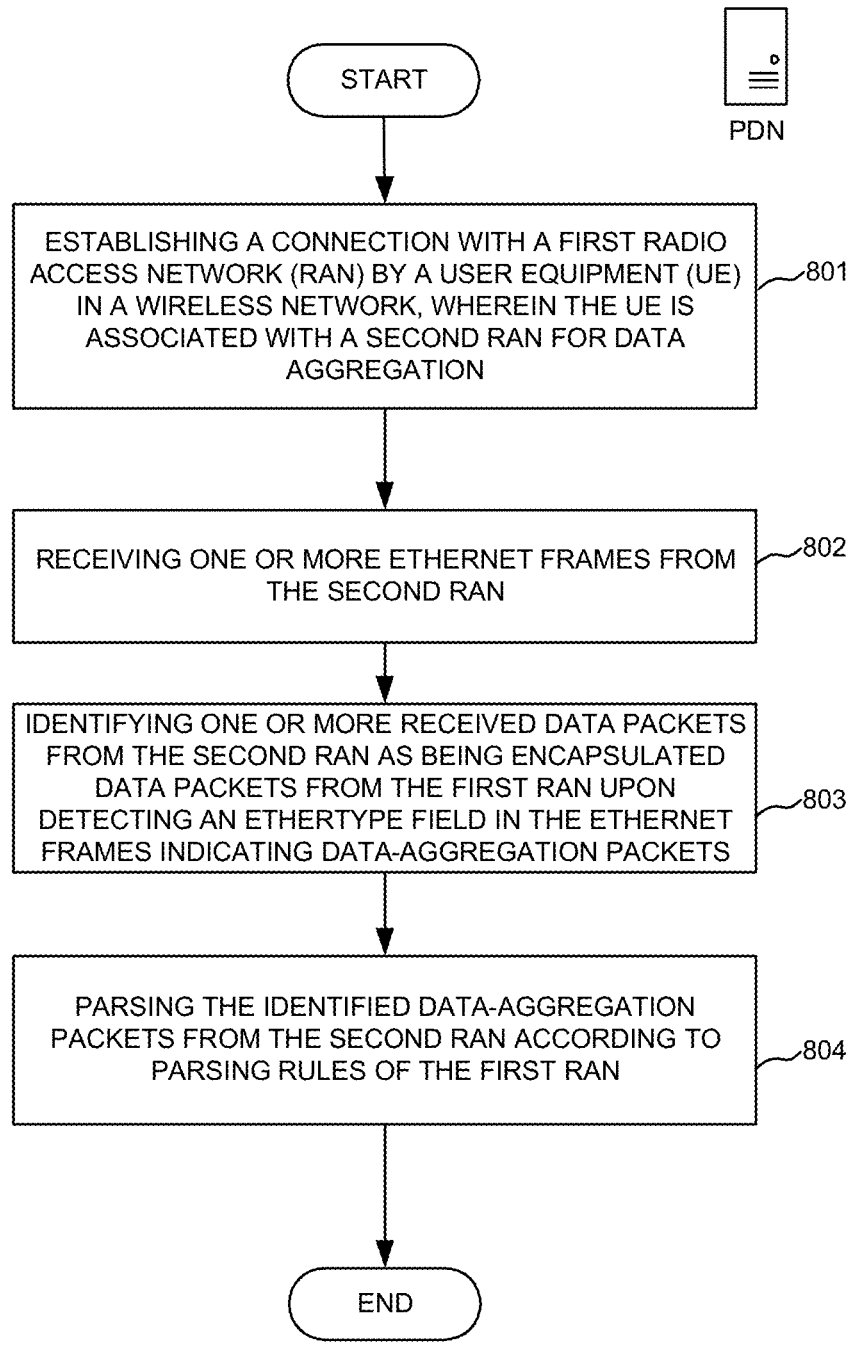
FIG. 8 shows an exemplary flow chart for the user-plane LWA using the EtherType field for the bridge and the WLAN terminated tunnel architectures in accordance with embodiments of the current invention.

FIG. 8 shows an exemplary flow chart for the user-plane LWA using the EtherType field for the bridge and the WLAN terminated tunnel architectures in accordance with embodiments of the current invention. At step 801, the UE establishes a connection with a first radio access network (RAN) in a wireless network, wherein the UE is associated with a second RAN for data aggregation. At step 802, the UE receives one or more Ethernet Frames from the second RAN. At step 803, the UE identifies one or more received data packets from the second RAN as being encapsulated data packets from the first RAN upon detecting an EtherType field in the Ethernet Frames indicating data-aggregation packets. At step 804, the UE parses the identified data-aggregation packets from the second RAN according to parsing rules of the first RAN.

Figure 9:
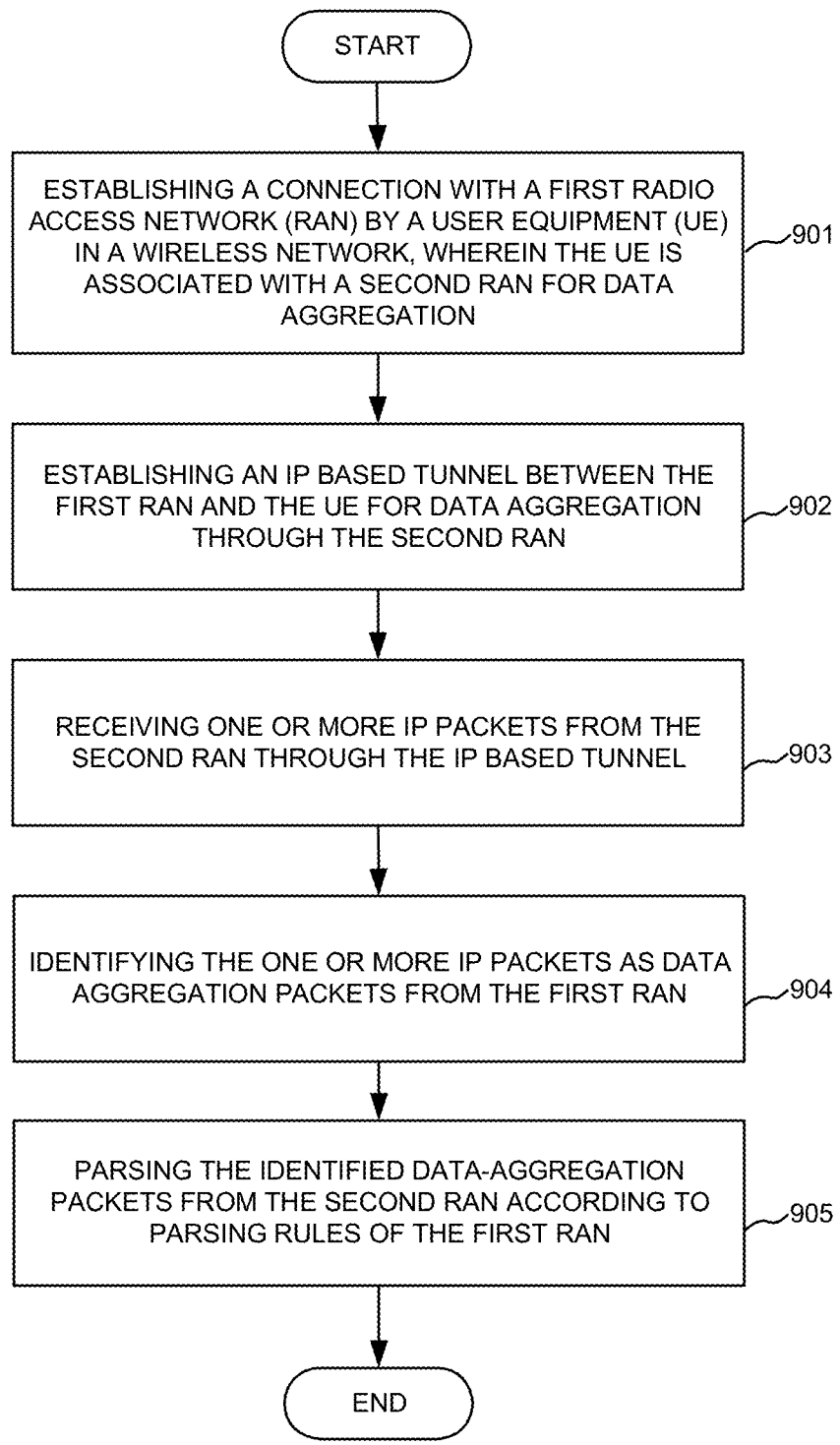
FIG. 9 shows an exemplary flow chart for the user-plane LWA using the UE terminated tunnel architecture in accordance with embodiments of the current invention.

FIG. 9 shows an exemplary flow chart for the user-plane LWA using the UE terminated tunnel architecture in accordance with embodiments of the current invention. At step 901, the UE establishes a connection with a first radio access network (RAN) in a wireless network, wherein the UE is associated with a second RAN for data aggregation. At step 902, the UE establishes an IP based tunnel between the first RAN and the UE for data aggregation through the second RAN. At step 903, the UE receives one or more IP packets from the second RAN through the IP based tunnel. At step 904, the UE identifies the one or more IP packets as data aggregation packets from the first RAN. At step 905, the UE parses the identified data-aggregation packets from the second RAN according to parsing rules of the first RAN.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a connection with a first radio access network (RAN) by a user equipment (UE) in a wireless network, wherein the UE is associated with a second RAN for data aggregation;
   receiving one or more Ethernet Frames from the second RAN;
   identifying one or more received data packets from the second RAN as being encapsulated data packets from the first RAN upon detecting an EtherType field in the Ethernet Frames indicating data-aggregation packets, and wherein data radio bearer (DRB) identity information is included in a data packet layer of the first RAN; and
   parsing the identified data-aggregation packets from the second RAN according to parsing rules of the first RAN.

2. The method of claim 1, wherein the first RAN is a long term evolution (LTE) network with packet data convergence protocol (PDCP), the second RAN is a WLAN network, and the data aggregation is a LTE-WLAN aggregation (LWA).

3. The method of claim 2, wherein the LTE entities and the WLAN entities are in the same virtual LAN (VLAN) created for LWA, and the LTE sets its EtherType field to be PDCP, which is copied to the EtherType field of the data packets sent to the UE by the WLAN.

4. The method of claim 2, wherein the EtherType field indicating PDCP, and wherein the PDCP data packets were transmitted by the LTE entity to the WLAN entity through a WLAN terminated (WT) tunneling between the LTE entities and the WLAN entities.

5. The method of claim 4, wherein the WT tunneling is one of IP based tunneling comprising: a Generic Routing Encapsulation (GRE) tunneling, an IPSec tunneling, and an IPnIP tunneling.

6. The method of claim 5, further comprising: reporting a WLAN MAC address of the UE to the LTE, wherein the WLAN MAC address of the UE is mapped to a facilitating field for data forward.

7. The method of claim 6, wherein the IP based tunneling is a GRE tunneling, and wherein the facilitating field is a KEY field in the GRE header.

8. The method of claim 6, wherein the IP based tunneling is an IPSec tunneling, and wherein the facilitating field is a SPI field in the IPSec header.

9. A method comprising:
   establishing a connection with a first radio access network (RAN) by a user equipment (UE) in a wireless network, wherein the UE is associated with a second RAN for data aggregation;
   establishing an IP based tunnel between the first RAN and the UE for data aggregation through the second RAN;
   receiving one or more IP packets from the second RAN through the IP based tunnel;
   identifying the one or more IP packets as data aggregation packets from the first RAN, wherein data radio bearer (DRB) identity information is included in a data packet layer of the first RAN; and
   parsing the identified data-aggregation packets from the second RAN according to parsing rules of the first RAN.

10. The method of claim 9, wherein the first RAN is a long term evolution (LTE) network with packet data convergence protocol (PDCP), the second RAN is a WLAN network, and the data aggregation is a LTE-WLAN aggregation (LWA).

11. The method of claim 10, further comprising: receiving a routable IP address from the LTE network through a radio resource control (RRC) signal channel.

12. The method of claim 10, wherein the IP based tunnel is one tunnel selected from a tunneling group comprising: a Generic Routing Encapsulation (GRE) tunnel, an IPSec tunnel, and an IPnIP tunnel.

13. The method of claim 12, wherein the IP based tunnel is an IPnIP tunnel, and wherein the LWA packets are identified using an LWA-specific protocol number.

14. The method of claim 12, wherein the IP based tunnel is a GRE tunnel, and wherein a KEY field of the GRE is used for identifying the DRB of the PDCP PDUs.

15. The method of claim 12, wherein the IP based tunnel is an IPSec tunnel, and wherein an SPI field of the GRE is used for identifying the data radio bearer (DRB) of the PDCP PDUs.

16. An user equipment (UE) connecting with a first RAN in a wireless communication network, comprising:
   a radio frequency (RF) transceiver that transmits and receives radio signals in the wireless communication network with the first RAN and a second RAN for LTE-WLAN aggregation (LWA);
   an LWA identifier that identifies one or more received Ethernet Frames from the second RAN as being data-aggregation packets from the first RAN upon detecting an EtherType field in the Ethernet Frames indicating data-aggregation packets, and wherein data radio bearer (DRB) identity information is included in a data packet layer of the first RAN; and
   a de-encapsulator that de-encapsulates the identified data-aggregation packets received from the second RAN according to parsing rules of the first RAN.

17. The UE of claim 16, wherein the LWA identifier identifies the data-aggregation packets based on an EtherType field of its corresponding Ethernet frame.

18. The UE of claim 17, wherein the EtherType indicates PDCP packets, and wherein the first RAN sends the data-aggregation packets to the UE through a virtual LAN (VLAN) created between the first RAN and the second RAN.

19. The UE of claim 17, wherein the EtherType indicates PDCP packets, and wherein the first RAN sends the data-aggregation packets to the UE through an IP based tunnel between the first RAN and the second RAN.

20. The UE of claim 16, further comprising: a UE-terminated tunnel creator that creates an IP based tunnel between the first RAN and the UE, and wherein the LWA identifier identifies data packets received from the IP based tunnel as the data-aggregation packets.

* * * * *